United States Patent Office  
3,262,855  
Patented July 26, 1966

3,262,855
8-ISO-17α-ETHYNYL-ESTRADIOL DERIVATIVES AND PROCESS
Robert Bucourt, Clichy-sous-Bois, France, assignor to Roussel-UCLAF, Paris, France, a corporation of France
No Drawing. Filed Mar. 2, 1964, Ser. No. 348,845
Claims priority, application France, Mar. 5, 1963, 926,873; June 5, 1963, 937,076, Patent M 2,802
7 Claims. (Cl. 167—74)

The present invention relates to new derivatives of an isomer of estrone as well as a process of preparation of these compounds.

The invention more particularly relates to ethynylated derivatives of 8-iso-estrone, that is to say, 8-iso-17α-ethynyl-estradiol of the formula:

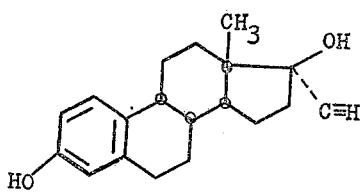

as well as its ethers and esters.

The compounds of the invention are endowed witth useful physiological properties and their pharmacological activity is remarkable. They present particularly an important estrogenic action.

An object of the present invention is the production of an 8-iso-estradiol derivative of the formula:

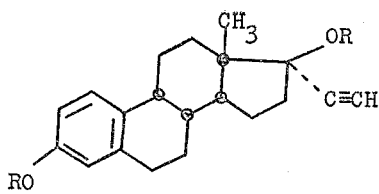

wherein R is a member selected from the group consisting of hydrogen, lower alkyl and the acyl radical of an organic carboxylic acid having from 1 to 18 carbon atoms.

A further object of the present invention is the development of a process for the production of an 8-iso-estradiol derivative of the formula:

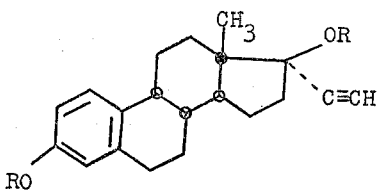

wherein R is a member selected from the group consisting of hydrogen, lower alkyl and the acyl radical of an organic carboxylic acid having from 1 to 18 carbon atoms, which comprises the steps of reacting 8-iso-estrone with an ethynylation agent selected from the group consisting of an alkali metal acetylide and ethynyl magnesium halide in an inert anhydrous solvent at a temperature from about room temperature to the reflux temperature and recovering said 8-iso-estradiol derivative.

Anoher object of the present invention is the development of a process for the treatment of estrogenic deficiencies which comprises administering from 0.01 to 4 milligrams per day of an 8-iso-estradiol derivative of the formula:

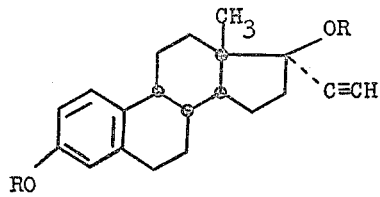

wherein R is a member selected from the group consisting of hydrogen, lower alkyl and the acyl radical of an organic carboxylic acid having from 1 to 18 carbon atoms.

A still further object of the present invention is the production of a therapeutic composition for treatment of estrogenic deficiencies which comprises 0.01 to 0.5 milligram per dose of an 8-iso-estradiol derivative of the formula:

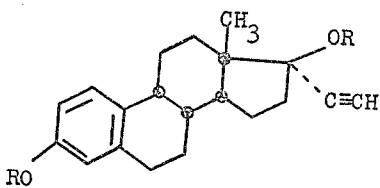

wherein R is a member selected from the group consisting of hydrogen, lower alkyl and the acyl radical of an organic carboxylic acid having from 1 to 18 carbon atoms, as active ingredient and of an inert pharmaceutical excipient.

These and other objects of the invention will become more apparent as the description thereof proceeds.

We have now discovered as new compounds, an 8-iso-estradiol derivative of the formula:

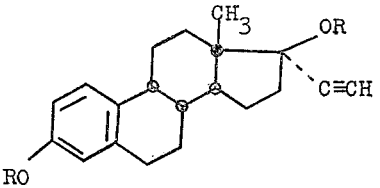

wherein R is a member selected from the group consisting of hydrogen, lower alkyl and the acyl radical of an organic carboxylic acid having from 1 to 18 carbon atoms.

8-iso-17α-ethynyl-estradiol, the preferred compound of the invention, exercises a clear estrogenic action superior to that of its isomer of natural configuration.

It is surprising to note that 8-iso-17α-ethynyl-estradiol is more active than its isomer of natural configuration since the contrary has been established for known iso compounds, such as for example, 8-iso-testosterone, 8-iso-progesterone or 8-iso-estrone. This is thus an unobvious and unexpected phenomena.

The process of preparation of these compounds, also the object of the present invention, is characterized essentially in that 8-iso-estrone is subjected to the action of an ethynylation agent. The 8-iso-17α-ethynyl-estradiol is obtained and it is transformed, if desired, into whatever desired ether or ester.

According to one preferential method of execution of the process, an alkali metal acetylide is employed as an ethynylation agent, for example, potassium acetylide or an organo-magnesium compound such as the iodide, bromide or chloride of ethynyl magnesium. The ethynylation reaction is conducted in an inert anhydrous solvent at a temperature from about room temperature to the reflux temperature.

The compounds produced, 8-iso-17α-ethynyl-estradiol or 8-iso-17α-ethynyl-Δ$^{1,3,5(10)}$-estratriene-3,17β-diol, from the ethynylation reaction may be further reacted according to usual procedures to etherify or esterify the phenol group in the 3-position, or both phenol and alcohol groups.

Esters and ethers of 8-iso-17α-ethynyl estradiol are advantageous in effecting the rate of absorption of the steroid in the body.

8-iso-17α-ethynyl-estradiol may be etherified by reaction with a lower alkyl etherifying agent such as dimethyl sulfate in an inert solvent under alkaline conditions.

8-iso-17α-ethynyl-estradiol may also be esterified by reaction with an esterifying derivative of an organic carboxylic acid having 1 to 18 carbon atoms such as the free acid, the acid chloride or the acid anhydride. Examples of suitable acids are alkanoic acids, such as formic acid, acetic acid, propionic acid, butyric acid, isobutyric acid, valeric acid, isovaleric acid, trimethyl acetic acid, caproc acid, β-trimethylpropionic acid, heptanoic acid, capyrylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenylacetic acid and phenylpropionic acid; aryl carboxylic acids such as benzoic acid and 2,4-dinitrobenzoic acid; phenoxy alkanoic acids such as phenoxyacetic acid, p-chloro-phenoxy acetic acid, 2,4-dichlorophenoxy acetic acid, 4-tert.-butylphenoxy acetic acid, 3-phenoxy propionic acid and 4-phenoxy butyric acid; heterocyclic carboxylic acids such as furane-2-carboxylic acid, 5-tert.-butylfurane-2-carboxylic acid, 5-bromofurane-2-carboxylic acid and nicotinic acids; β-ketoalkanoic acid such as acetylacetic acid, propionylacetic acid and butyrylacetic acid; amino acids such as diethylamino acetic acid and aspartic acid.

The following examples are given as indicative and enable a better comprehension of the invention. It is obvious however, to one skilled in the art, that other expedients may be employed.

*Example I.—Preparation of 8-iso-17α-ethynyl-estradiol by the action of potassium acetylide*

2.5 gm. of potassium were introduced into a mixture of 25 cc. of t-amyl alcohol and 10 cc. of anhydrous benzene under an atmosphere of nitrogen. The reaction mixture was heated under agitation for a period of one hour at 55–60° C. Then a current of acetylene was passed through the solution obtained while maintaining the temperature at 55–60° C. for a period of one hour and a half.

After cooling to room temperature, 500 mg. of 8-iso-estrone (obtained according to Serini et al., Ber. 1938, 71, p. 186 and following) in 16 cc. of anhydrous tetrahydrofuran and 10 cc. of anhydrous benzene were introduced into the potassium acetylide solution. The reaction mixture was agitated at room temperature while passing a slight current of acetylene therethrough for a period of about 2 hours. Then the reaction mixture was poured into water and decanted. The organic phase was washed with water, dried and evaporated to dryness under vacuum. The residue which crystallized in the presence of water was washed with cyclohexane and supplied 8-iso-17α-ethynylestradiol having a melting point of 164° C. and a specific rotation [α]$_D^{20}$=−69.5° (c.=1% in dioxane).

The product occurred in the form of white crystals, soluble in organic solvents such as benzene, chloroform, alcohol, ether and acetone.

*Analysis.*—$C_{20}H_{24}O_2$; molecular weight=296.39 (on a product dried at 135° C.); calculated: C, 81.04%; H, 8.16%. Found: C, 80.8%; H, 8.2%.

This compound is not described in the literature.

*Example II.—Preparation of 8-iso-17α-ethynyl-estradiol by the action of ethynyl magnesium bromide*

A current of methyl bromide was bubbled through a suspension of 12.5 gm. of magnesium in 200 cc. of anhydrous ether at reflux.

270 cc. of tetrahydrofuran were added to 120 cc. of the solution of the magnesium compound thus obtained and acetylene was bubbled therethrough for a period of 3 hours. A solution of ethynyl magnesium bromide was obtained in which 1 gm. of 8-iso-estrone in 40 cc. of tetrahydrofuran was introduced.

The reaction mixture was heated to reflux under an atmosphere of nitrogen for a period of 2 hours. Then after cooling, 150 cc. of a saturated solution of ammonium chloride were added. Next the mixture was poured into water and extracted with ether.

Evaporation of the ethereal solutions furnished a residue which, treated as in Example I, supplied 8-iso-17α-ethynyl-estradiol, identical in all respect to the product described in Example I.

*Example III.—Preparation of the methyl ether in the 3-position of 8-iso-17α-ethynyl-estradiol starting from 8-iso-17α-ethynyl-estradiol*

8-iso-17α-ethynyl-estradiol was dissolved under agitation and under an atmosphere of nitrogen in 5 volumes of 95% alcohol and 2 volumes of 2 N sodium hydroxide solution at room temperature. Next the mixture was heated to 50–60° C. and 2.35 moles of dimethyl sulfate were introduced rapidly. After three minutes of agitation, the addition of 2 N sodium hydroxide solution and of dimethyl sulfate was recommenced and repeated three times. Finally 1 volume of 2 N sodium hydroxide solution was added and the agitation was continued for a further 15 minutes. Thereafter the mixture was diluted with iced water. The precipitate was vacuum filtered and dried. The methyl ether in the 3-position of 8-iso-17α-ethynyl-estradiol, or 3 - methoxy - 8 - iso - 17α - ethynyl-Δ$^{1,3,5(10)}$-estratriene-17β-ol, was obtained.

This compound is not described in the literature.

*Example IV.—Preparation of the 3-hexahydrobenzoate of 8-iso-17α-ethynyl-estradiol*

8-iso-17α-ethynyl-estradiol was dissolved in 5 volumes of pyridine. 1.5 volumes of hexahydrobenzoyl chloride were added in the cold while agitating and the reaction mixture was allowed to stand for a period of 24 hours at room temperature. Next some water was added to the reaction mixture which was then extracted with chloroform. The chloroformic solution was dried, filtered and the chloroform was removed by heating. The 3-hexahydrobenzoate of 8-iso-17α-ethynyl-estradiol, or 3-hexahydrobenzoyloxy-8-iso - 17α - ethynyl-Δ$^{1,3,5(10)}$-estratriene-17β-ol, was obtained.

This compound is not described in the literature.

*Example V.—Preparation of the diacetate of of 8-iso-17α-ethynyl-estradiol*

1 gm. of 8-iso-17α-ethynyl-estradiol and 0.3 gm. of p-toluene sulfonic acid (monohydrate) were introduced into 20 cc. of pure acetic acid and the reaction mixture was allowed to stand at room temperature overnight. Thereafter, the reaction mixture was poured into water. The precipitate was vacuum filtered and the diacetate of 8-iso-17α-ethynyl-estradiol, or 3,17β - diacetyloxy - 8 - iso - 17α-ethynyl-Δ$^{1,3,5(10)}$-estratriene, was obtained.

This compound is not described in the literature.

As has already been mentioned above, 8-iso-17α-ethynyl-estradiol as well as its ethers and its esters are endowed with interesting pharmacological properties. They present particularly an important estrogenic action.

Thus, 8-iso-17α-ethynyl-estradiol possesses estrogenic action particularly marked on the uterus all while affecting the vaginal mucous membrane only to a very weak degree.

8-iso-17α-ethynyl-estradiol can be utilized for the treatment of amenorrhea, hypomenorrhea, luteinic insufficiencies, repeated abortions, premenstrual disturbances and disturbances of menopause.

17α-ethynyl-8-iso-$\Delta^{1,3,5(10)}$-estratriene-3,17β-diol can be utilized orally, perlingually, transcutaneously, in local applications or rectally. It can be prepared in the form of injectable solutions or suspensions, prepared in ampules or in multiple-dose flacons; in the form of implants, of tablets, of glossettes, of suppositories, of ovules and of pommades.

The useful dosology is controlled between 10 micrograms and 4 milligrams per day in the adult as a function of the method of administration and of the desired therapeutic effect.

The pharmaceutical forms such as injectable solutions or suspensions, implants, tablets, glossettes, supporitories, ovules or pommades are prepared according to the usual processes.

*Example VI.—Pharmacological study of 8-iso-17α-ethynyl-estradiol*

The estrogenic activity of 8-iso-17α-ethynyl-estradiol in comparison with that of 17α-ethynyl-estradiol was determined by the Allen-Doisy test according to the technique described by Feyel-Cabanes, C.R. Soc. Biol. 1956, 150, 1881, and by the test of the weight of the uterus.

(a) *Allen-Doisy test.*—The test of estrogenic activity was effected on castrated female rats weighing 140 gm.±20 gm., separated into groups of four. The product studied was administered orally to one of the groups and to another 17α-ethynyl-estradiol was administered orally at the same dose of 50γ, in olive oil containing 5% benzylic alcohol. Vaginal smears were made each day at the same hour. Only those smears formed exclusively of keratinized or cornified cells were reported as positive. The following results were obtained:

TABLE I

| Treatment | Dose administered | Groups of rats | Number of days during which the rats presented an estrus ||||
|---|---|---|---|---|---|---|
|  |  |  | +++ | ++ | + | 0 |
| 8-iso-17α ethynyl-estradiol. | 50γ | 1st animal | 0 | 1 | 2 | 3 |
|  |  | 2nd animal | 0 | 0 | 2 | 4 |
|  |  | 3rd animal | 0 | 0 | 1 | 5 |
|  |  | 4th animal | 0 | 0 | 2 | 4 |
| 17α-ethynylestradiol | 50γ | 1st animal | 1 | 2 | 0 | 3 |
|  |  | 2nd animal | 1 | 0 | 3 | 2 |
|  |  | 3rd animal | 0 | 1 | 3 | 2 |
|  |  | 4th animal | 1 | 0 | 3 | 2 |

*Explanation of above table.*—Thus there is, for example, for rat Nr. 1, if rats are treated with 8-iso-17α-ethynyl-estradiol:

0 day with a strong estrus ----------------------- (+++)
    1 day with a rather strong estrus ---------------- (++)
    2 days with an average strength ------------------ (+)
    3 days without estrus ---------------------------- (0)
    ―
    Total 6 days (b) *Test of the weight of the uterus.*—8-iso-17α-ethynyl-estradiol, utilized in solution in olive oil containing 5% of benzylic alcohol, was administered orally to some lots of immature female rats, 22 to 23 days old, at total doses of 0.125γ, 0.250γ and 0.500γ divided into six administrations (two each day for a period of three days). The activity of the product was determined in comparison with 17α-ethynyl-estradiol administered under the same conditions at total doses of 0.250γ, 0.500γ and 1γ in the first test and at 0.1875γ, 0.375γ and 0.750γ in the second test. The animals were sacrificed and autopsied the fourth day 72 to 75 hours after the first administration. The uterus were separated and weighed. The following table assembles the results obtained:

TABLE II

| 17α-ethynyl-estradiol || 8-iso-17α-ethynyl-estradiol ||
|---|---|---|---|
| Doses administered (total doses) in γ | Weight of the uterus in mg. | Doses administered (total doses) in γ | Weight of the uterus in mg. |
| 1st Test: |  |  |  |
| 0.250 | 29.68 | 0.125 | 30.2 |
| 0.500 | 57.98 | 0.250 | 47.44 |
| 1 | 81.42 | 0.500 | 60.26 |
| 2nd Test: |  |  |  |
| 0.1875 | 28.04 | 0.125 | 36.04 |
| 0.375 | 49.82 | 0.250 | 55.10 |
| 0.750 | 66.68 | 0.500 | 74.56 |

From the above two tests of estrogenic activity, it can be seen that whereas the estrogenic activity of 8-iso-17α-ethynyl-estradiol is, in the Allen-Doisy test, inferior to that of 17α-ethynyl-estradiol, the graphic calculation shows that in the test of the weight of the uterus, the 8-iso-17α-ethynyl-estradiol, which is the object of the invention, manifests to the contrary an activity more than one and a half times superior to that of the estrogen utilized as the product of reference.

*Determination of toxicity.*—8-iso-17α-ethynyl-estradiol utlized in aqueous suspension was administered orally at a dose of 50 mg./kg. to a group of 10 female mice weighing 20 gm.

After eight days of observation there was noted no mortality nor toxic manifestation. The product is thus devoid of toxicity under acute test on mice at a dose of 50 mg./kg. administered orally.

It is to be understood that the above specific embodiments are illustrative of the invention, but are not to be deemed limitative. Obviously other expedients known to the art may be employed without departing from the spirit of the invention or the scope of the appended claims.

I claim:

1. An 8-iso-estradiol derivative of the formula:

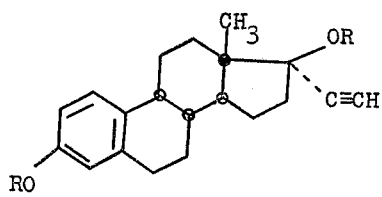

wherein R is a member selected from the group consisting of hydrogen, lower alkyl and the acyl radical of an organic carboxylic acid having from 1 to 18 carbon atoms.

2. 8-iso-17α-ethynyl-estradiol.

3. The methyl ether in the 3-position of 8-iso-17α-ethynyl-estradiol.

4. The 3-hexahydrobenzoate of 8-iso-17α-ethynyl-estradiol.

5. The diacetate of 8-iso-17α-ethynyl-estradiol.

6. A process for the treatment of estrogenic deficiencies in warm blooded animals which comprises administering from 0.01 to 4 milligrams per day of an 8-iso-estradiol derivative of the formula:

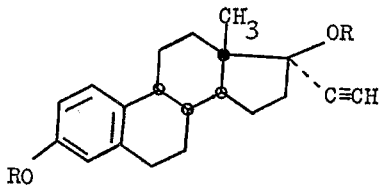

wherein R is a member selected from the group consisting of hydrogen, lower alkyl and the acyl radical of an organic carboxylic acid having from 1 to 18 carbon atoms.

7. A therapeutic composition for treatment of estrogenic deficiencies in warm blooded animals which comprises 0.01 mg. to 0.5 mg. of an 8-iso-estradiol derivative of the formula:

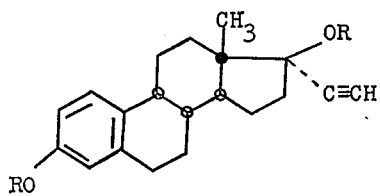

wherein R is a member selected from the group consisting of hydrogen, lower alkyl and the acyl radical of an organic carboxylic acid having from 1 to 18 carbon atoms, as active ingredient and an inert pharmaceutical excipient.

References Cited by the Examiner

UNITED STATES PATENTS

| | | | |
|---|---|---|---|
| 2,744,122 | 5/1956 | Djerassi et al. | 260—397.4 |
| 2,846,455 | 8/1958 | Muller | 260—397.5 |
| 2,863,886 | 12/1958 | Mancera et al. | 260—397.5 |
| 3,159,543 | 12/1964 | Ercoli | 167—74 |

OTHER REFERENCES

Applezweig, Steroid Drugs, pages 447 and 453 (1963), McGraw-Hill, New York.

Fieser et al., Steroids, page 463 (1959), Reinhold Pub. Co., New York.

LEWIS GOTTS, *Primary Examiner.*

HENRY A. FRENCH, *Assistant Examiner.*